United States Patent
Kim et al.

(10) Patent No.: US 9,454,401 B2
(45) Date of Patent: Sep. 27, 2016

(54) RESOURCE ALLOCATION METHOD AND APPARATUS OF GPU

(71) Applicant: Samsung Electronics Co., Ltd, Gyeonggi-do (KR)

(72) Inventors: Kwonsik Kim, Gyeonggi-do (KR); Youngwoo Ahn, Seoul (KR); Jeongig Song, Seoul (KR); Inchoon Yeo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 13/750,837

(22) Filed: Jan. 25, 2013

(65) Prior Publication Data
US 2013/0198757 A1 Aug. 1, 2013

(30) Foreign Application Priority Data

Jan. 27, 2012 (KR) .................. 10-2012-0008453

(51) Int. Cl.
*G06F 9/46* (2006.01)
*G06F 9/50* (2006.01)
*G06T 1/20* (2006.01)

(52) U.S. Cl.
CPC ........... *G06F 9/5011* (2013.01); *G06F 9/5066* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 8,321,849 B2 * | 11/2012 | Nickolls et al. | 717/146 |
| 2006/0098017 A1 | 5/2006 | Tarditi, Jr. et al. | |
| 2007/0136730 A1 | 6/2007 | Wilt et al. | |
| 2007/0294666 A1 * | 12/2007 | Papakipos | G06F 8/20 717/119 |
| 2008/0114937 A1 * | 5/2008 | Reid et al. | 711/117 |
| 2009/0128574 A1 | 5/2009 | Fujii et al. | |
| 2010/0218196 A1 * | 8/2010 | Leung et al. | 718/107 |
| 2011/0035736 A1 | 2/2011 | Stefansson et al. | |
| 2011/0067016 A1 * | 3/2011 | Mizrachi et al. | 717/149 |
| 2012/0081373 A1 * | 4/2012 | Li et al. | 345/520 |
| 2013/0138923 A1 * | 5/2013 | Barber et al. | 712/203 |

FOREIGN PATENT DOCUMENTS

WO WO 2010/043401 A2 4/2010

OTHER PUBLICATIONS

Yi Yang, Ping Xiang, Jingfei Kong, Huiyan Zhou; GPGPU Compiler for Memory Optimization and Parallelism Management; Jun. 5-10, 2010.*
Marisabel Guevara, Chris Gregg, Kim Hazelwood, Kevin Skadron; Enabling task parallelism in the CUDA Scheduler; Sep. 2009.*
Extended European Search Report dated Jun. 6, 2013 in connection with European Patent Application No. 13152661.8, 8 pages.

(Continued)

Primary Examiner — Dong Kim (57) ABSTRACT

A resource allocation method and apparatus utilize the GPU resource efficiently by sorting the tasks using General Purpose GPU (GPGPU) into operations and combining the same operations into a request. The resource allocation method of a Graphic Processing Unit (GPU) according to the present disclosure includes receiving a task including at least one operation; storing the at least one operation in unit of request; merging data of same operations per request; and allocating GPU resource according to an execution order the request.

20 Claims, 10 Drawing Sheets

(56) References Cited

OTHER PUBLICATIONS

International Search Report dated May 16, 2013 in connection with International Patent Application No. PCT/KR2013/000571, 4 pages.

Mikhail Bautin et al., "Graphic Engine Resource Management", Proceedings of SPIE, International Society for Optical Engineering, vol. 6818, Jan. 28, 2008, 12 pages.

* cited by examiner

FIG. 4B $$\begin{bmatrix} 1 & 3 & 7 \\ 1 & 0 & 0 \\ 1 & 2 & 2 \end{bmatrix} + \begin{bmatrix} 0 & 0 & 5 \\ 7 & 5 & 0 \\ 2 & 1 & 1 \end{bmatrix} = \begin{bmatrix} 1+0 & 3+0 & 7+5 \\ 1+7 & 0+5 & 0+0 \\ 1+2 & 2+1 & 2+1 \end{bmatrix} = \begin{bmatrix} 1 & 3 & 12 \\ 8 & 5 & 0 \\ 3 & 3 & 3 \end{bmatrix}$$

Matrix add $$\begin{bmatrix} 1 & 0 & 2 \\ -1 & 3 & 1 \end{bmatrix} \cdot \begin{bmatrix} 3 & 1 \\ 2 & 1 \\ 1 & 0 \end{bmatrix} = \begin{bmatrix} (1\cdot3+0\cdot2+2\cdot1) & (1\cdot1+0\cdot1+2\cdot0) \\ (-1\cdot3+3\cdot2+1\cdot1) & (-1\cdot1+3\cdot1+1\cdot0) \end{bmatrix}$$

Matrix Multiply

RESOURCE ALLOCATION METHOD AND APPARATUS OF GPU

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Jan. 27, 2012 and assigned Serial No. 10-2012-0008453, the contents of which are herein incorporated by reference.

TECHNICAL FIELD

The present disclosure relates to a resource allocation method and apparatus of a Graphic Processing Unit (GPU). In more particular, the present disclosure relates to a resource allocation method and apparatus that is capable of utilizing the GPU resource efficiently by sorting the tasks using General Purpose GPU (GPGPU) into operations and merging the same operations into a request.

BACKGROUND

Figure 1:
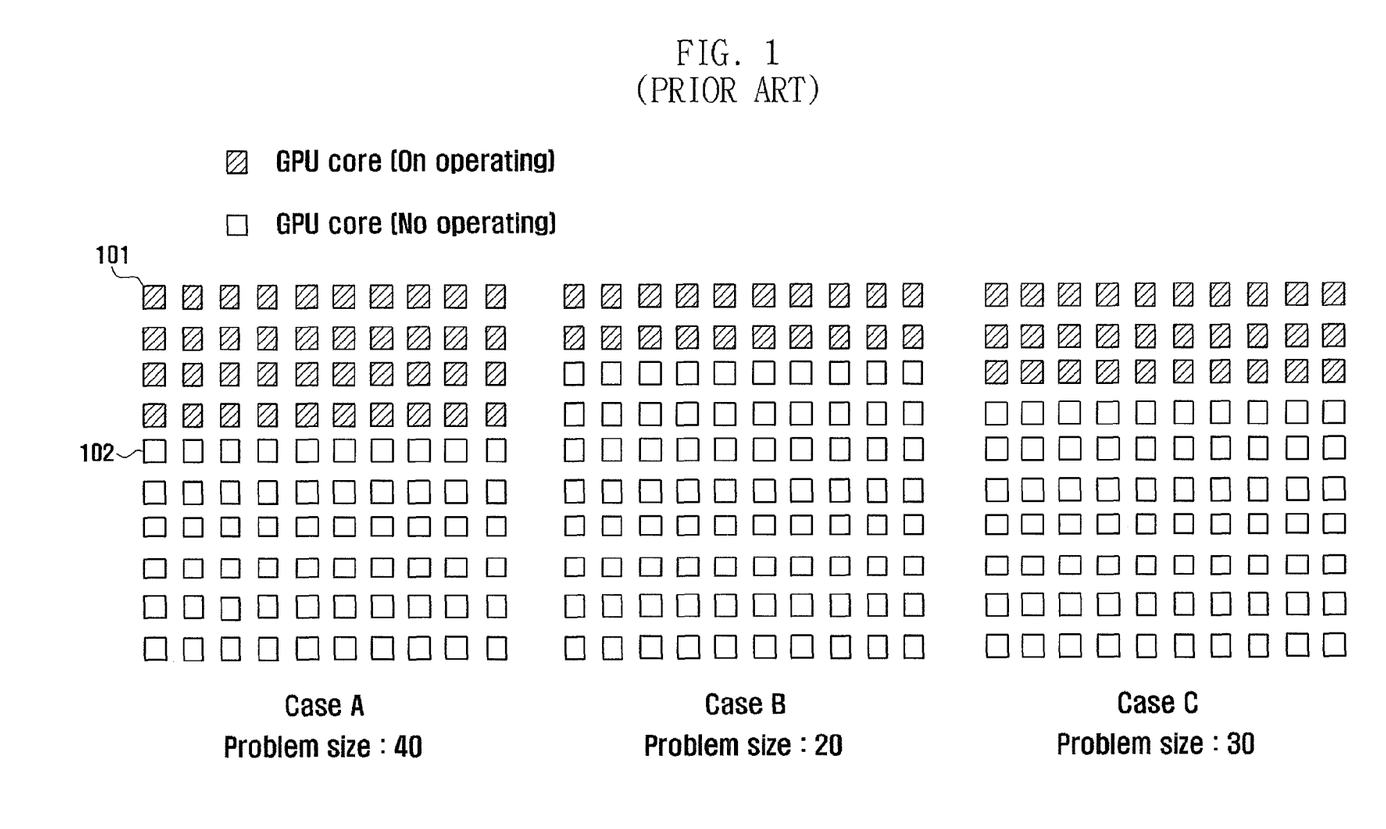
FIG. 1 illustrates a structure of a conventional programming model for processing a request using GPU.

FIG. 1 illustrates a structure of a conventional programming model for processing a request using GPU. FIG. 1 is directed to the GPU core utilization for GPGPU request in three cases of performing the same operation with different program sizes.

In FIG. 1, cases A, B, and C directed to the GPGPU requests with the problem sizes of 40, 20, and 30 respectively. The shaded block 101 indicates the core performing an operation, and the blank block 102 indicates the core performing no operation. Since the number of GPU cores is 100, the utilization rate of the GPU core is 40%, 20%, and 30% at most.

Since the same operation is being performed, the same program is loaded on the cores. Also, since the numbers of data are 40, 20, and 30 in the respective cases A, B, and C; although they are summed, the total number of data becomes 90 which is less than the number of GPU cores (i.e. 100). This is an inevitable problem occurring currently because the operation request to the GPU is generated in unit of task.

In the conventional GPGPU programming model, the data processing request is processed in unit of task. Accordingly, it is impossible to optimize the utilization at the operation level lower than the task level.

Meanwhile, if the GPU operating in a pipeline mechanism is capable of performing the same type of operations in sequence, the program executed by the GPU core is fixed to increase the pipeline's efficiency. In the conventional GPGPU programming model, however, the request is processed in unit of task and thus it is impossible to execute the same type of operations in sequence.

SUMMARY

To address the above-discussed deficiencies of the prior art, it is a primary object of the present disclosure to provide a resource allocation method and apparatus that is capable of allocating GPU resource at operation level efficiently.

It is another object of the present disclosure to provide a resource allocation method and apparatus that is capable of improving pipeline efficiency of GPU.

In accordance with an aspect of the present disclosure, a resource allocation method of a Graphic Processing Unit (GPU) includes receiving a task including at least one operation; storing the at least one operation in unit of request; merging data of same operations per request; and allocating GPU resource according to an execution order the request.

In accordance with another aspect of the present disclosure, a resource allocation apparatus of a Graphic Processing Unit (GPU) includes a memory which stores at least one request; and a controller which controls receiving a task including at least one operation, storing the at least one operation in unit of request, merging data of same operations per request, and allocating GPU resource according to an execution order the request.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5b illustrates a request processing structure optimized through the request optimization procedure of FIG. 5a;

DETAILED DESCRIPTION

FIGS. 2 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The same reference numbers are used throughout the drawings to refer to the same or like parts. In the drawings, certain elements may be exaggerated or omitted or schematically depicted for clarity of the disclosure, and the actual sizes of the elements are not reflected. Exemplary embodiments of the present disclosure are described with reference to the accompanying drawings in detail.

Figure 2:
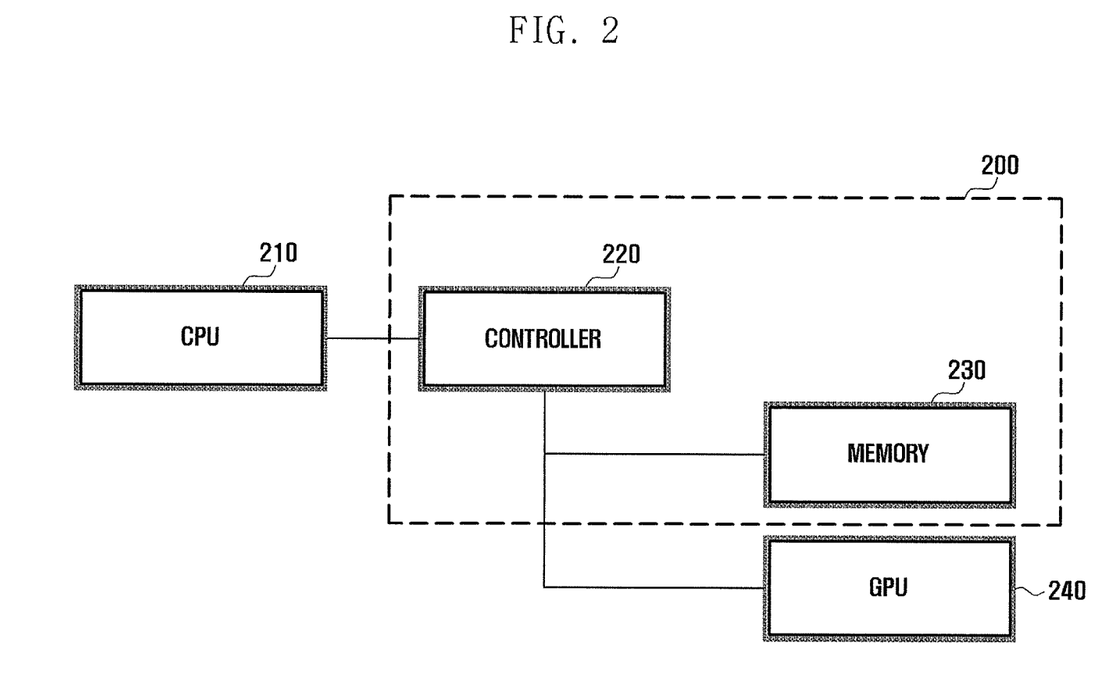
FIG. 2 illustrates a block diagram of a resource allocation apparatus according to an embodiment of the present disclosure.

FIG. 2 illustrates a block diagram of a resource allocation apparatus according to an embodiment of the present disclosure.

As shown in FIG. 2, the resource allocation apparatus 200 includes a GPU resource allocator 220, i.e. a controller, and a memory 230. Although FIG. 2 is directed to the exemplary embodiment where the CPU 210 and the resource allocation apparatus 200 are depicted as separate function blocks, the present disclosure is not limited to this configuration. The resource allocation apparatus 200 can be configured to operate in association with the CPU 210 or the GPU 240 according to the system implementation.

The CPU 210 transfers the task information generated with the GPGPU programming model to the resource allocation apparatus 200. Upon receipt of the task information, the resource allocation apparatus 200 divides a task into operations to assign GPU resource allocation priority. If the assignment result is received from the resource application apparatus 200, the GPU 240 processes (executes) the request in the order of priority.

In more detail, the controller 220 controls the memory 230 to receive a task including at least one operation, sort the at least one operation into requests, and stores the requests in a queue in the order of first in first out way.

The controller 220 also determines whether a number of requests is greater than a threshold value to check the dependency of the data of the operation, i.e. whether other operation result is required for performing the current operation. This determination is performed to prevent the request optimization operation from causing significant overhead.

If the number of requests stacked in the queue is greater than the threshold value, this means that the data has no dependency and thus the controller 220 executes the request optimization operation. The controller 220 reorders the request execution priorities in the queue according to the optimization result. The optimization procedure is described later with reference to accompanying drawings.

Figure 3:
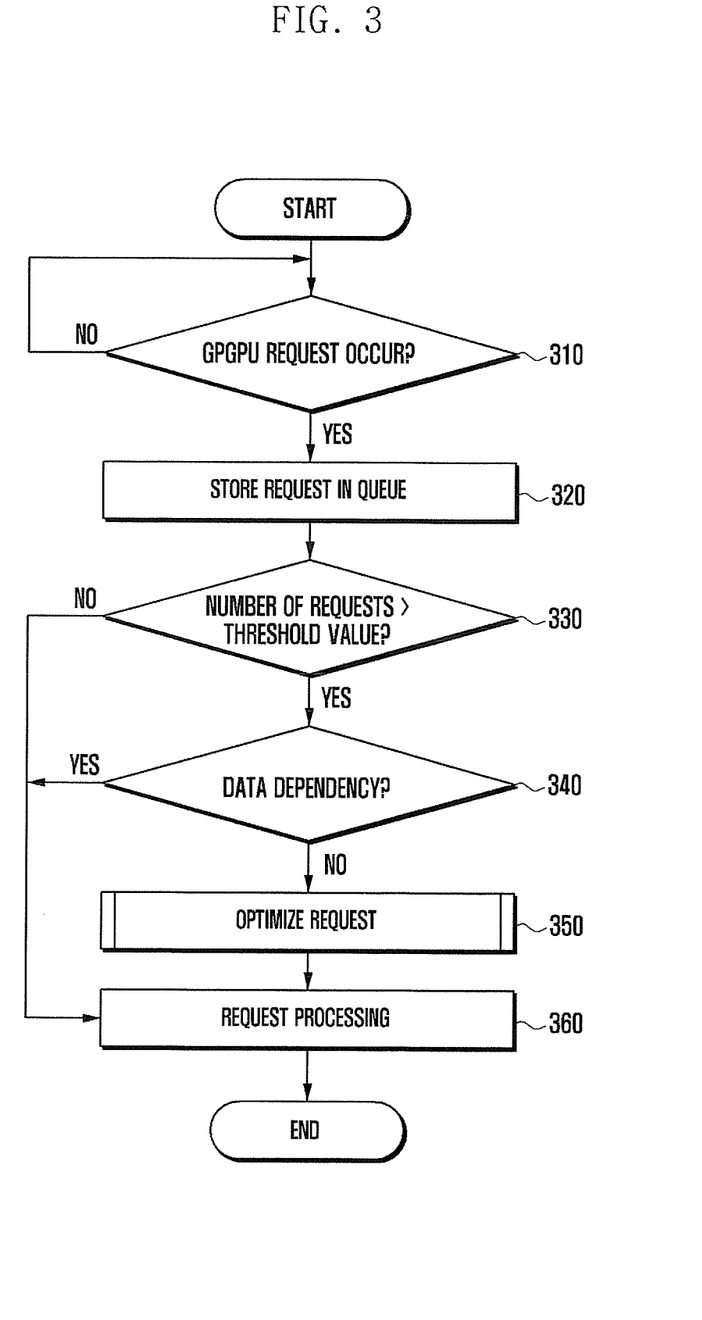
FIG. 3 illustrates a flowchart of a resource allocation method according to an embodiment of the present disclosure.

FIG. 3 illustrates a flowchart of a resource allocation method according to an embodiment of the present disclosure.

The controller 220 receives the tasks generated through the GPGPU programming model at step 310. Next, the controller 220 divides the received task into operations to generate a request queue. In the queue, the operations to be executed per task are queued in sequence at step 320.

The controller 220 determines whether the number of requests is greater than a threshold value at step 330. The threshold value can be set by the controller 220 in advance according to the system implementation, and detailed description is made later with reference to FIG. 8.

If the number of requested operations is not greater than the threshold value for optimization, the controller 220 transfers the queued operations to the GPU such that the GPU executes the operations in sequence at step 360.

If the number of requested operations is greater than the threshold value, the controller 220 checks the data dependency at step 340.

The controller 220 determines whether the input and output data of at least two operations requested in the same task have data dependency in the execution order. The controller 220 adds an input data as well as the original input data by taking notice of the characteristic of the requested operation to determine whether the added input data may influence to the output data.

The data dependency is checked because when any dependency exists between the data of the merged or seriated operations the merging overhead becomes greater than the gain expected from the merge. Accordingly, it is preferred to perform the request optimization only when no data dependency problem exists. The data dependency is described with reference to FIGS. 4a and 4b.

Figure 4A:
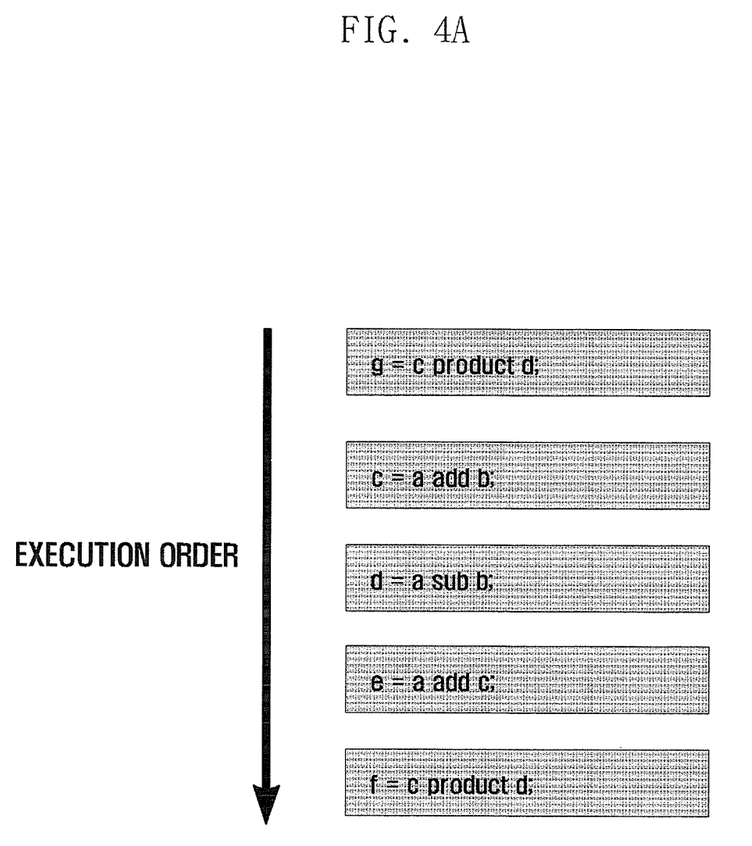
FIG. 4a illustrates exemplary data dependency generated by the operation execution order in the resource allocation method according to an embodiment of the present disclosure.

FIG. 4a illustrates exemplary data dependency generated by the operation execution order in the resource allocation method according to an embodiment of the present disclosure.

It is not always possible to merge or seriate the operations. This is because of the data dependency. The data dependency problems can be categorized into inter-operation dependency problem occurred by the execution order in the same task and intra-operation data dependency occurred by the characteristic of the operation.

The operation having the execution order as shown in FIG. 4a can be an example of the inter-operation dependency problem. In FIG. 4a, "a", "b", "c", and "d" may denote vectors or matrices. As a result of the second and third operations, the data of c and d are determined.

The fourth operation is an add operation with the input of "a" and "c" as the result of the second operation. If the data merging is performed for the second and fourth operations, the add operation with a is performed before the determination of the data of c so as to obtain a correct result.

In the cases of the first and last operations, it may be impossible to perform a seriating operation. This is because although both the cases are the production operations the last operation has to be performed with the input of c and d of which values are changed through the second and third operations.

Figure 4B:
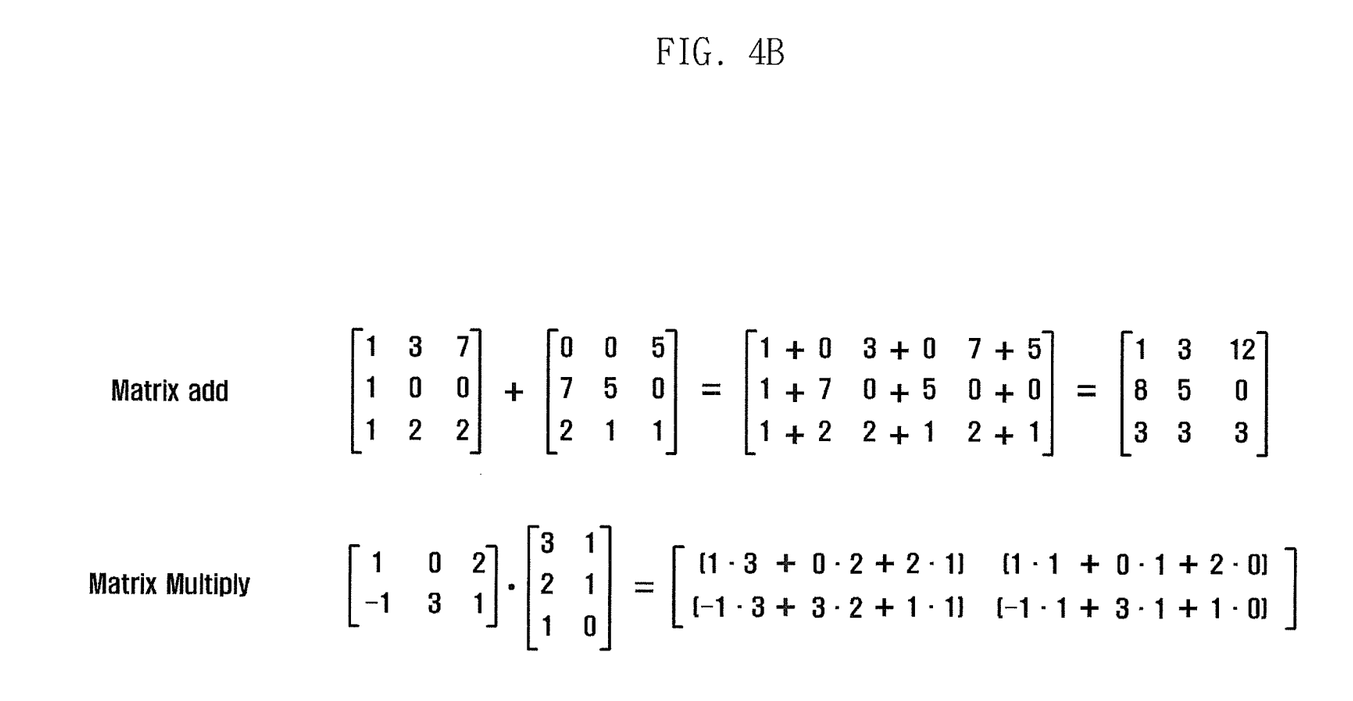
FIG. 4b illustrates exemplary data dependency caused by operation characteristic, i.e. intra-operation data dependency, in the resource allocation method according to an embodiment of the present disclosure.

FIG. 4b illustrates exemplary data dependency caused by operation characteristic, i.e. intra-operation data dependency, in the resource allocation method according to an embodiment of the present disclosure.

FIG. 4b shows exemplary matrix add and matrix multiply operations. In the example of the matrix add operation, the data having the same index are added in the input matrix, and the operation result also exists at the position having the same index.

In the example of matrix multiply operation, however, the operation is influenced by a value of data having a different index. If it is required to process the data existing in a previous request through data merging, the processing overhead becomes greater than the gain expected from the data merge. Accordingly, the request optimization process has to be performed only when there is not data dependency problem.

Returning to FIG. 3, the controller 220 performs the request optimization, process at step 350, which is described in detail with reference to FIGS. 5 and 6.

Figure 5A:
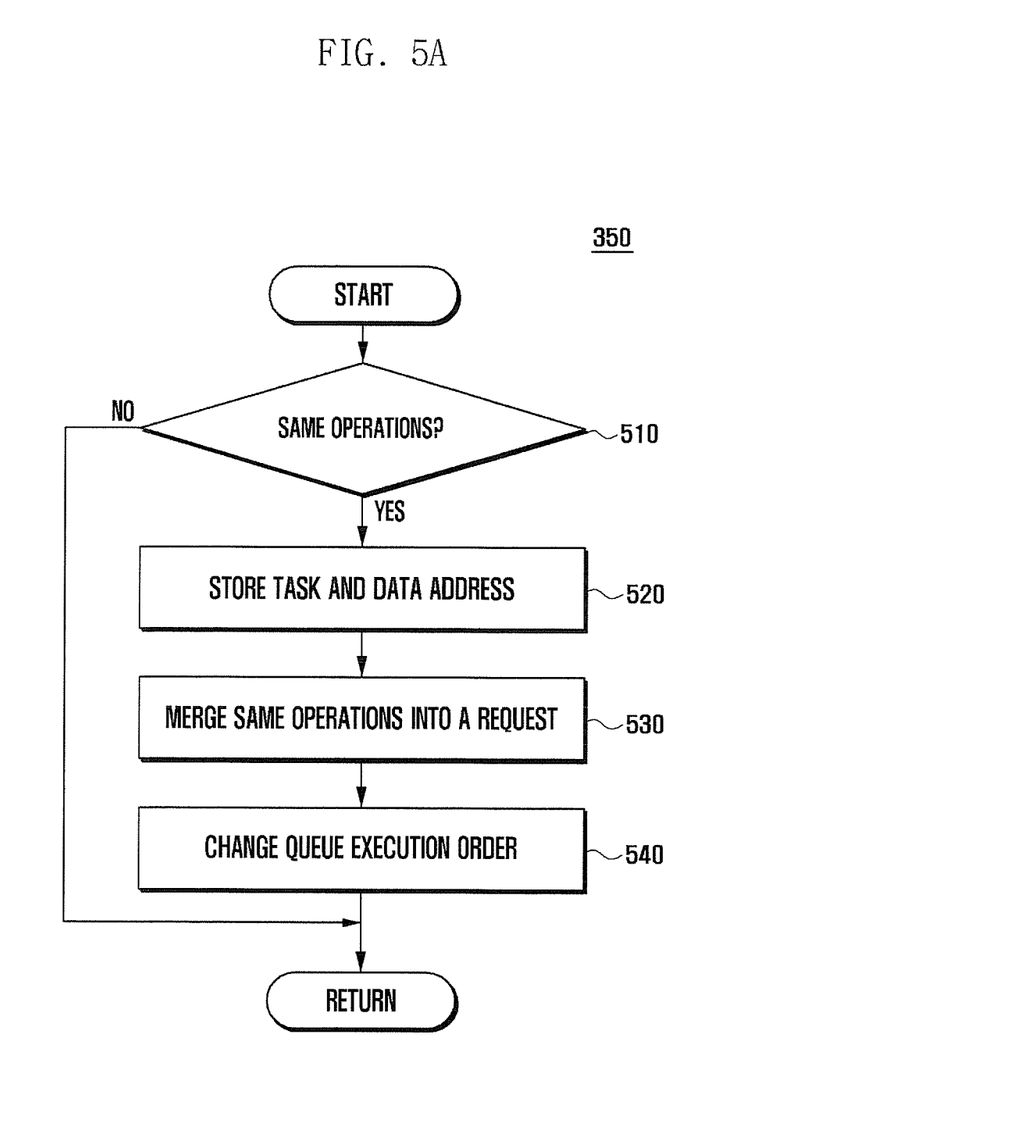
FIG. 5a illustrates a flowchart of the details of the request optimization step 350 of FIG. 3 according to an embodiment of the present disclosure.

FIG. 5a illustrates a flowchart of details of the request optimization step 350 of FIG. 3 according to an embodiment of the present disclosure.

The controller 220 determines at step 510 whether same operations exist, and stores, if the same operations exist, the data of the operations and the address of the data of the operation at step 520. This is because the positions of the requested tasks and data differ from each other.

The controller 220 merges the same operations into a request at step 530. In the present disclosure, combining the data of at least two same operations into a request is referred to as merging.

Finally, the controller 220 changes the request execution order in the queue at step 540.

Figure 5B:
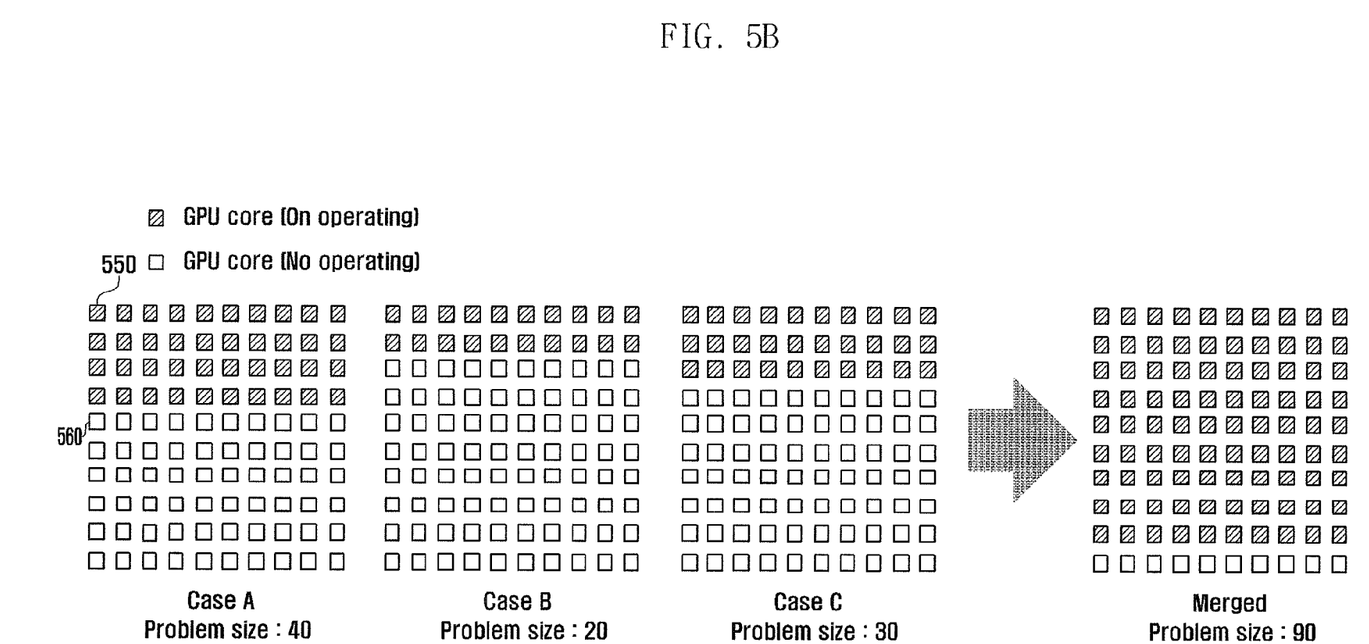

FIG. 5b is a diagram illustrating a request processing structure optimized through the request optimization procedure of FIG. 5a.

FIG. 5b shows an example where the request cases A, B, and C with the problem sizes of 40, 20, and 30 respectively in association with 100 GPU cores.

If each case is performed independently as in the conventional method, the operation has to be performed three times. According to an embodiment of the present disclosure, if the operations of the respective cases are identical with each other, it is possible to processing the operations at a time by allocating the idle cores 560 of case A for cases B and C.

Figure 6:
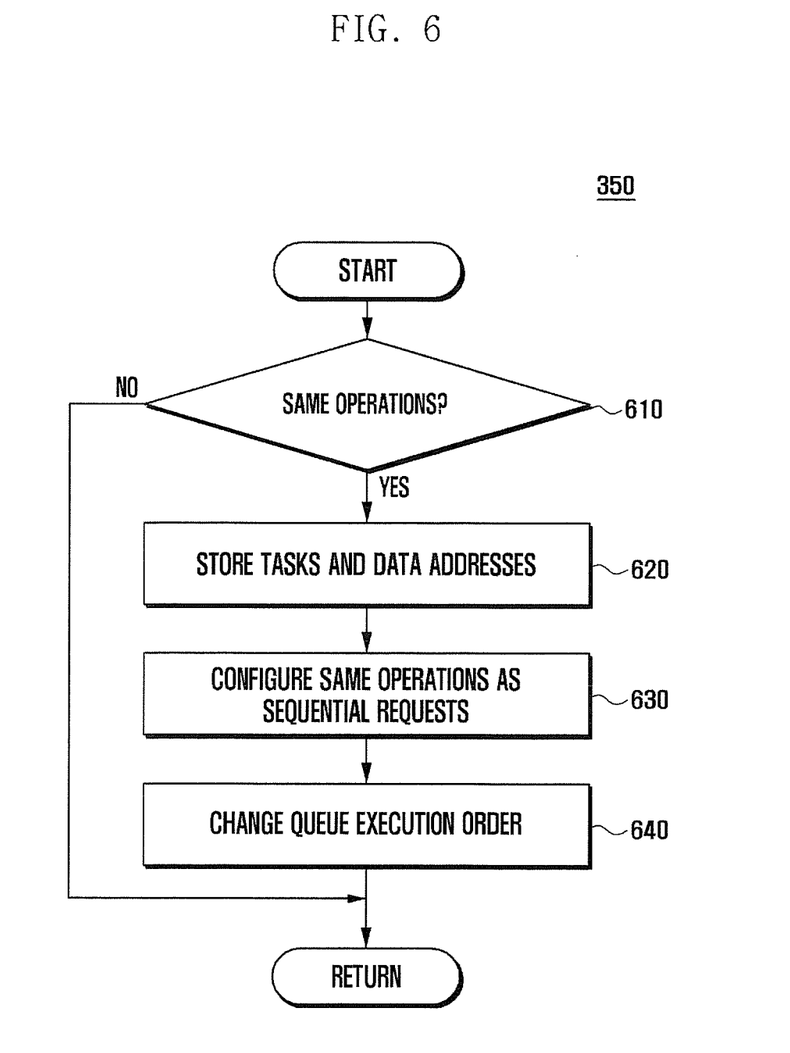
FIG. 6 illustrates a flowchart of details of the request optimization step 350 of FIG. 3 according to another embodiment of the present disclosure.

FIG. 6 illustrates a flowchart of details of the request optimization step 350 of FIG. 3 according to another embodiment of the present disclosure.

The controller 220 checks the existence of the same type of operations at step 610 and stores the data of the operations and the address of the task including the operations. This is because the operations are different in requested task and data location.

The controller 220 configures the same type of operations as sequential requests at step 630. In the present disclosure, arranging at least to same operations sequentially is referred to as seriating.

The GPGPU performs the work for loading the shader program implemented to execute the operation on the vertex processor and fragment processor. In the case that the same operations are processed repeatedly, it is possible to reduce the loading works of the shader program, which has to be changed continuously due to the frequent change of operation.

If the same operations are executed in sequence, what to be done is to change the data set such that the execution times of the vertex processor and fragment processor become consistent, resulting in improvement of pipeline efficiency. Accordingly, in the case that the same operations are distributed in the request list, if the operations can be seriated, it is possible to increase the pipeline efficiency. The controller 220 seriates the operations at step 630. Finally, the controller 220 changes the request execution order of the queue at step 640.

Returning to FIG. 3, the controller 220 requests the GPU 240 for processing at step 360.

Afterward, if the GPU 240 has completed processing, the controller 220 receives the result data from the GPU 240 and transfers the result data to the CPU 210 based on the task and data address stored at step 520 of FIG. 5a and 620 of FIG. 6.

Figure 7:
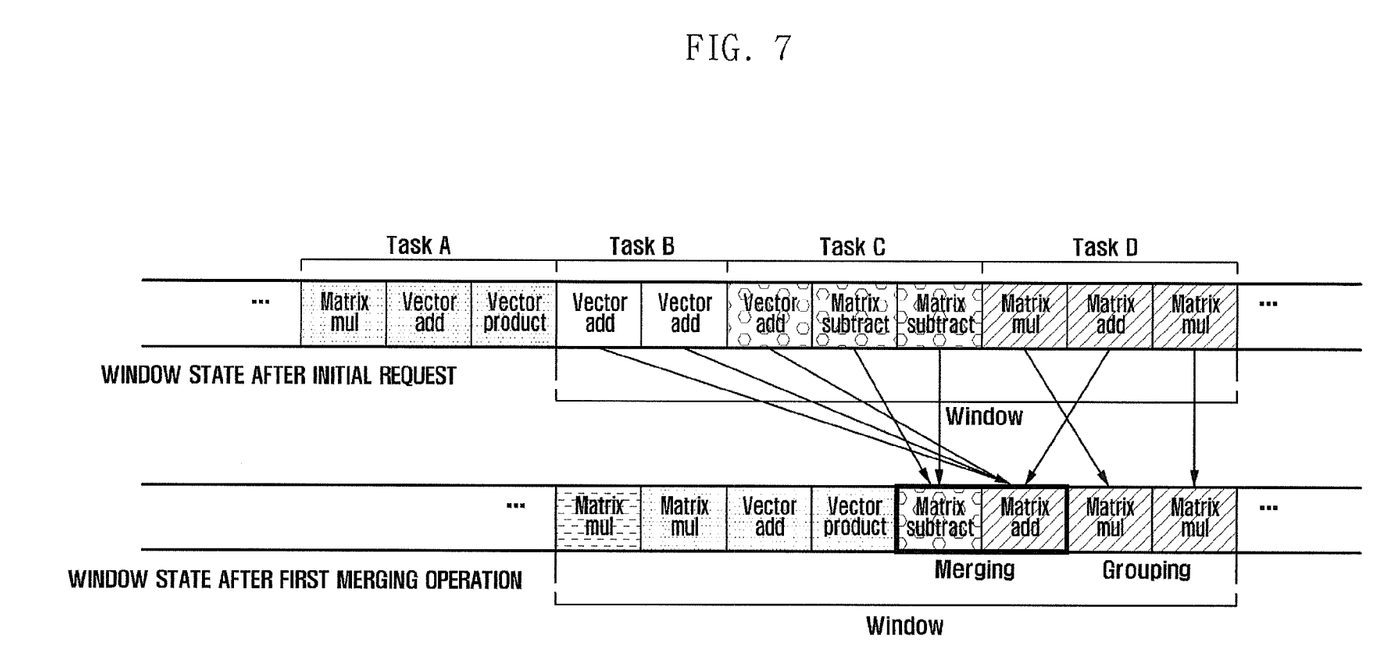
FIG. 7 illustrates a window mechanism for request optimization in the resource allocation method according to an embodiment of the present disclosure.

FIG. 7 illustrates a window mechanism for request optimization in the resource allocation method according to an embodiment of the present disclosure.

According to an embodiment of the present disclosure, the resource allocation apparatus 220 uses a window mechanism for determining the time for performing optimization process. This is because the request list optimization operation may cause overhead.

Accordingly, the resource allocation apparatus 200 performs the optimization process when the number of GPGPU requests is greater than a predetermined threshold value in a range for optimization process, i.e. the optimization window. FIG. 7 is directed to the case where the window size is 8. If the number of requests is greater than the window size, i.e. threshold value, the optimization process is triggered. The window size and the threshold value can be set differently depending on the system.

The upper and lower parts of FIG. 7 show the state of the request list in the queue before and after the optimization. As shown in FIG. 7, the GPU generates the request in unit of task before optimization; the operations requested in the same task are gathered.

After optimization, the add and subtract operations are merged into a same types of operations, respectively. Furthermore, the two matrix multiply requests of task D are optimized to be arranged in a sequential order.

Figure 8:
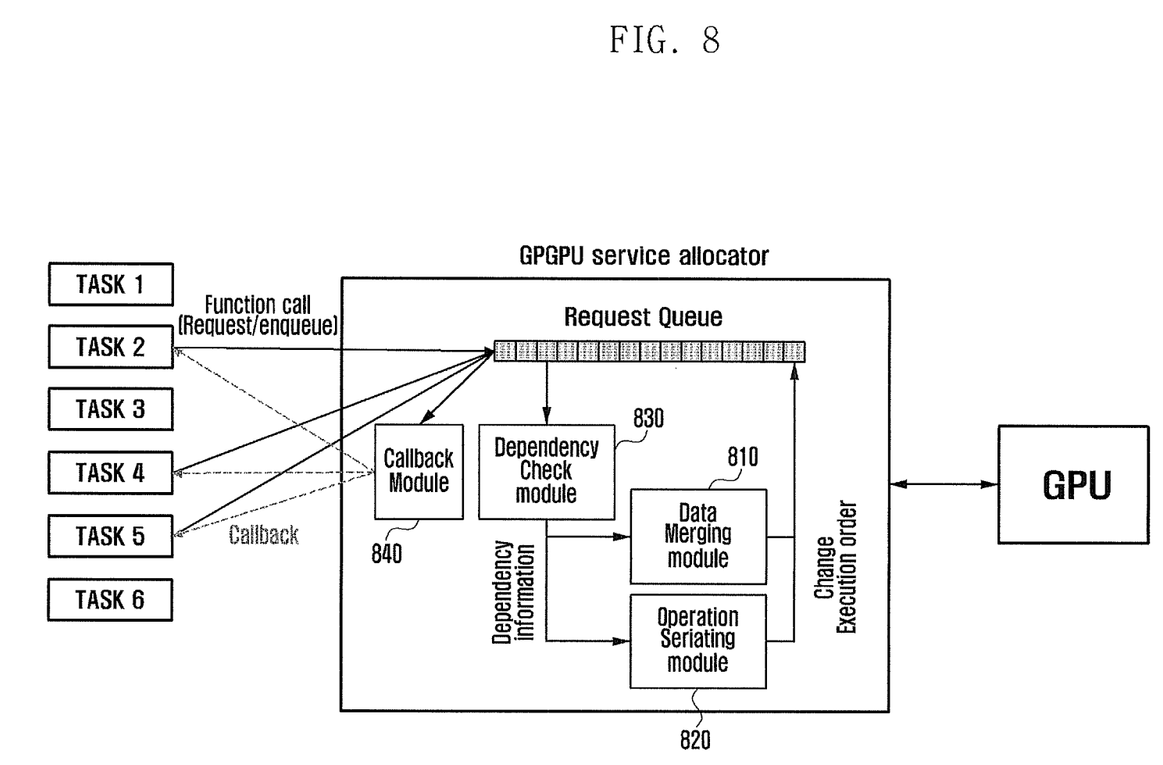
FIG. 8 illustrates a configuration of the resource allocation apparatus according to an embodiment of the present disclosure.

FIG. 8 illustrates a configuration of the resource allocation apparatus according to an embodiment of the present disclosure.

FIG. 8 is directed to an exemplary case of the queue-based data structure to perform the operation level optimization for the GPGPU request in a multi-core and multi-tasking environment.

As shown in FIG. 8, the resource allocation apparatus 200 according to an embodiment of the present disclosure includes a merging module 810 for performing optimization of the requests queued for the tasks, an operation seriating module 820, and a dependency check module 830 for checking the dependency of the data requested before starting the optimization process. The execution position of these modules can be a GPU device driver or the operating system depending on the system implementation.

The tasks 2, 4, and 5 depicted in FIG. 8 are the tasks using the GPGPU programming model. The tasks 2, 4, and 5 request for a GPGPU service (enqueuing and function call). In the queue, the operations per task to be executed are queued in sequence.

If the number of requested operations is not greater than the optimized threshold value, the resource allocation apparatus 200 executes the operations in the queue in sequence by means of the GPU device driver.

If the number of requests stored in the queue becomes greater than the threshold in the state where the GPU is operating, the resource allocation apparatus 200 performs the optimization process for the request list.

The resource allocation apparatus 200 extracts the data dependency information for the request list in the window by means of the dependency check module and performs the data merging and operation seriating processes based on the data dependency information.

If the GPU enters the idle state after completing the previous operation, the resource allocation apparatus 200 executes the requests waiting in the queue in the optimized order. The resource allocation apparatus 200 further includes a callback module 840 which notifies the task which has requested for the GPGPU service of the operation completion using the callback mechanism stored in the queue data structure. The callback mechanism may change depending on the implementation way such as callback function, event trigger, and signal.

As described above, the resource allocation method and apparatus of the present disclosure is capable of reducing the number of request processing times of the GPU so as to improve the efficiency of the GPU core utilization.

Also, the resource allocation method and apparatus of the present disclosure is capable of increasing the efficiency of the GPU pipeline, resulting in reduction of system response latency.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A resource allocation method for a Graphic Processing Unit (GPU) comprising a plurality of cores, the method comprising:
   receiving a plurality of operations including respective data;
   identifying a plurality of order-independent operations from the plurality of operations, wherein the order-independent operations are independent from an execution order of other operations;
   grouping the plurality of order-independent operations into operation type groups according to types of each of the plurality of order-independent operations;
   seriating each of the operation type groups of order-independent operations into respective requests; and
   allocating the plurality of cores to the seriated operation type groups of order-independent operations according to the seriation,
   wherein the plurality of cores are allocated to a plurality of order-dependent operations of the plurality of operations in order of receiving the plurality of order-dependent operations that are dependent from the execution order of the other operations.

2. The method of claim 1, further comprising arranging the plurality of order-independent operations within each operation group sequentially as a function of receptions of the plurality of operations.

3. The method of claim 1, further comprising determining whether a number of the plurality of operations is greater than a predetermined threshold value.

4. The method of claim 3, further comprising:
   determining, prior to determining whether the number of the plurality of operations is greater than the predetermined threshold, whether data of the plurality of operations are dependent on each other.

5. The method of claim 1, wherein a task is generated using a General Purpose GPU (GPGPU) program language.

6. The method of claim 1, further comprising storing the plurality of order-independent operations in a queue structure in a unit of request.

7. The method of claim 6, wherein resources of the GPU comprise the plurality of processing cores.

8. The method of claim 7, further comprising changing an execution order of the plurality of order-independent operations in the queue structure according to an order of the operations within each operation group.

9. A resource allocation apparatus for a Graphic Processing Unit (GPU) comprising a plurality of cores, the apparatus comprising:
   GPU resources comprising a plurality of processing cores; and
   a controller configured to:
      receive a plurality of operations including respective data;
      identify a plurality of order-independent operations from the plurality of operations, wherein the order-independent operations are independent from an execution order of other operations;
      group the plurality of order-independent operations into operation type groups according to types of each of the plurality of order-independent operations;
      seriate each of the operation type groups of order-independent operations into respective requests; and
      allocate the plurality of cores to the seriated operation type groups of order-independent operations according to seriation,
   wherein the plurality of cores are allocated to a plurality of order-dependent operations of the plurality of operations in order of receiving the plurality of order-dependent operations that are dependent from the execution order of the other operations.

10. The apparatus of claim 9, wherein the controller is configured to arrange the plurality of order-independent operations within each operation group sequentially as a function of receptions of the operations.

11. The apparatus of claim 9, wherein the controller is configured to determine whether a number of the plurality of operations is greater than a predetermined threshold value.

12. The apparatus of claim 11, wherein the controller is configured to determine whether data of the operations are dependent on each other.

13. The apparatus of claim 9, wherein a task is generated using a General Purpose GPU (GPGPU) program language.

14. The apparatus of claim 9, wherein the controller is configured to store the plurality of order-independent operations in a queue structure in a unit of request.

15. The apparatus of claim 14, wherein resources of the GPU comprise the plurality of processing cores.

16. The apparatus of claim 15, wherein the controller is configured to change an execution order of the plurality of order-independent operations in the queue structure according to an order of operations within each operation group.

17. A non-transitory computer readable medium storing a computer program for resource allocation of a Graphic Processing Unit (GPU) comprising a plurality of cores, the computer program configured to, when executed by a processor, cause the processor to:
   receive a plurality of operations including respective data;
   identify a plurality of order-independent operations from the plurality of operations, wherein the order-independent operations are independent from an execution order of other operations;
   group the plurality of order-independent operations into operation type groups according to types of each of the plurality of order-independent operations;
   seriate each of operation type groups of order-independent operations into respective requests; and allocating the plurality of cores to the seriated operation type group of order-independent operations according to seriation, wherein the plurality of cores are allocated to a plurality of order-dependent operations of the plurality of operations in order of receiving the plurality of order-dependent operations that are dependent from the execution order of the other operations.

18. The computer readable medium of claim 17, wherein the computer program is configured to, when executed by the processor, cause the processor to arrange the plurality of order-independent operations in sequence as a function of receptions of the plurality of operations.

19. The computer readable medium of claim 18, wherein the computer program is further configured to, when executed by the processor, cause the processor to determine whether a number of the plurality of operations is greater than a predetermined threshold value.

20. The computer readable medium of claim 19, wherein the computer program is configured to, when executed by a processor, cause the processor to determine whether the number of the plurality of operations is greater than the predetermined threshold, whether data of the plurality of operations are dependent on each other.

* * * * *